United States Patent [19]

Pfleger et al.

[11] Patent Number: 4,788,265

[45] Date of Patent: Nov. 29, 1988

[54] PREPARATION OF COPOLMERS OF ETHYLENE WITH ACRYLIC ACID ESTERS IN A TUBULAR REACTOR AT ABOVE 500 BAR

[75] Inventors: Klaus Pfleger; Klaus Boettcher, both of Wesseling; Oskar Buechner, Dudenhofen; Friedrich Kanne, Wesseling; Siegfried Kursawe, Wesseling; Wieland Zacher, Wesseling, all of Fed. Rep. of Germany

[73] Assignee: BASF Aktiengesellschaft, Fed. Rep. of Germany

[21] Appl. No.: 41,232

[22] Filed: Apr. 22, 1987

[30] Foreign Application Priority Data

May 9, 1986 [DE] Fed. Rep. of Germany ....... 3615562

[51] Int. Cl.$^4$ ............. C08F 2/00; C08F 2/38; C08F 220/02; C08F 220/10
[52] U.S. Cl. .................... 526/64; 526/79; 526/87; 526/318.45; 526/329
[58] Field of Search ............ 526/64, 88, 329, 79, 526/318.45, 87

[56] References Cited

U.S. PATENT DOCUMENTS

| 3,725,378 | 4/1973 | Chamberlin | 526/64 |
| 3,917,577 | 11/1975 | Trieschmann et al. | 526/64 |
| 4,042,767 | 8/1977 | Payer et al. | 526/64 |
| 4,076,919 | 2/1978 | Urban et al. | 526/64 |
| 4,135,044 | 1/1979 | Beals | 526/64 |
| 4,579,918 | 4/1986 | Metzger et al. | 526/64 |

FOREIGN PATENT DOCUMENTS

| 0096221 | 12/1983 | European Pat. Off. | 526/64 |
| 0098488 | 1/1984 | European Pat. Off. | 526/64 |

Primary Examiner—Joseph L. Schofer
Assistant Examiner—F. M. Teskin
Attorney, Agent, or Firm—Keil & Weinkauf

[57] ABSTRACT

Copolymers of ethylene with acrylates or solutions of free acrylic acid in acrylates are prepared in a continuously operated tubular polymerization system at high pressures and temperatures by feeding a mixture of ethylene, acrylate, initiator and, if appropriate, regulant into the polymerization system in the form of a main stream at the inlet point thereof and at the same time through two or more secondary streams, secondary streams (I) being metered in at points where the reaction temperature has just exceeded a maximum temperature due to the heat of polymerization and secondary streams (II) at points which, relative to the direction of flow of the ethylene, are upstream of the feed points of secondary streams (I) and upstream of the respective maximum temperature.

5 Claims, 1 Drawing Sheet

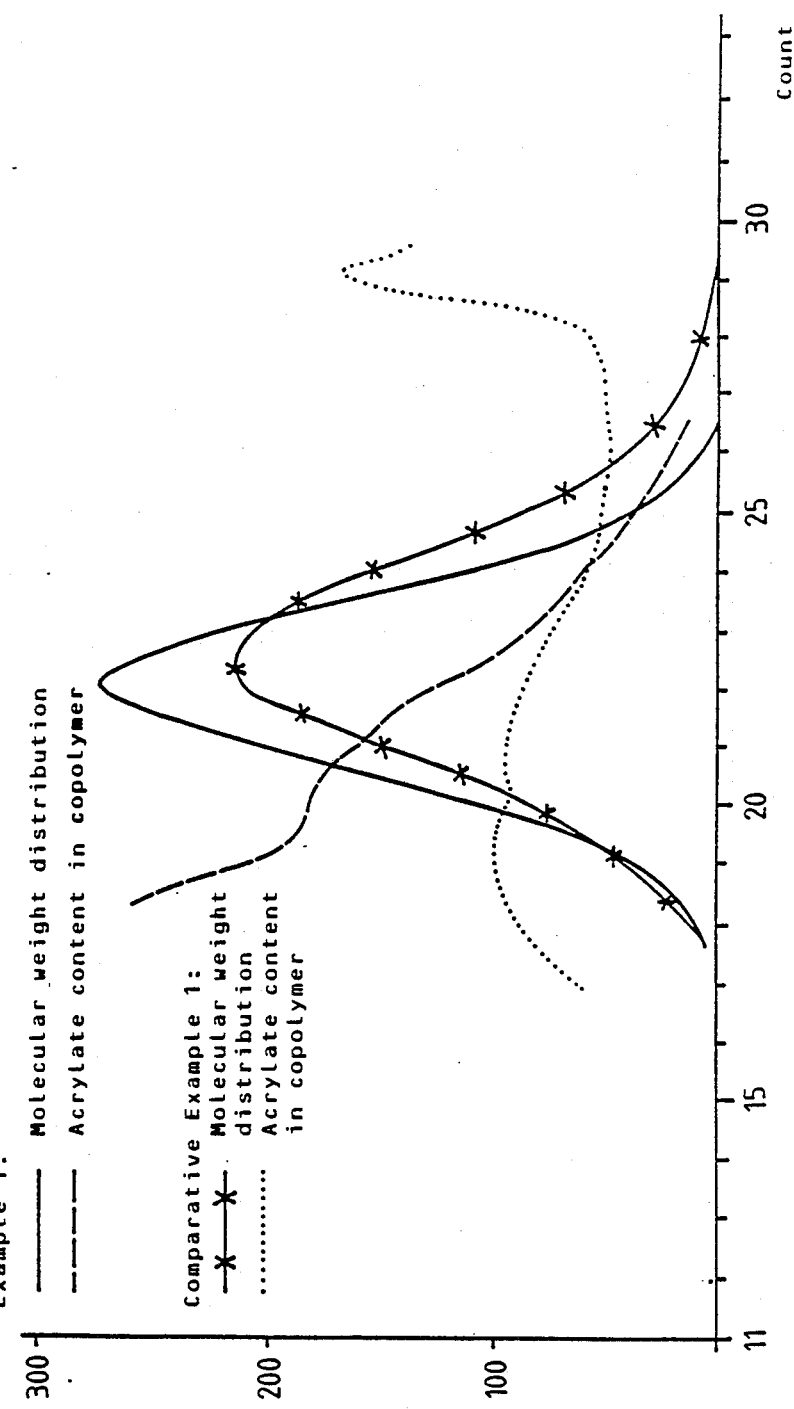

PREPARATION OF COPOLMERS OF ETHYLENE WITH ACRYLIC ACID ESTERS IN A TUBULAR REACTOR AT ABOVE 500 BAR

The present invention relates to a process for preparring copolymers of ethylene with acrylic acid esters by copolymerizing 100 parts by weight of ethylene with from 0.1 to 25 parts by weight of an acrylic acid ester or a solution of free acrylic acid in an acrylic acid ester in a continuously operated tubular polymerization system at pressures of from 500 to 5,000 bar and temperatures of from 50° to 450° C. in the presence of a polymerization initiator which decomposes into free radicals, by feeding a mixture of ethylene, comonomer, initiator and, if appropriate, regulant into the polymerization system in the form of a main stream at the inlet point thereof and at the same time in the form of two or more secondary streams behind the inlet point along the polymerization system.

It is known in the high pressure polymerization of ethylene to divide the ethylene stream into a plurality of bleed streams and to introduce the main stream, after heating to initiation temperature, into the initial part of a tubular reactor. In this known process, the other secondary stream or streams are then fed into the reactor at a plurality of successive points in the direction of flow of the ethylene to be polymerized. In this process, the cold ethylene is introduced into the reactor at or shortly downstream of the points where the polymerization mixture in the reactor has exceeded the maximum allowable polymerization temperature and the temperature of the ethylene which is introduced cold and which likewise contains initiator is set in such a way that, after mixing into the reactor, the temperature does not drop below the temperature required to initiate the polymerization of the ethylene, which depends on the catalyst used (cf. GB Pat. Nos. 1,010,847, 915,210 and 1,347,361).

In this way it is possible to increase the conversion of ethylene to polyethylene per pass. With this known process, small amounts of atmospheric oxygen are added as polymerization initiator to the ethylene, for example before or after compression. Instead of atmospheric oxygen it is also possible to add peroxides or hydroperoxides or mixtures thereof (cf. U.S. Pat. No. 3,725,378).

It is also known that ethylene copolymers can be prepared by feeding a mixture of ethylene, initiator, regulant and acrylic acid ester into a tubular polymerization system at the inlet point thereof and at the same time at a second point downstream of the inlet point where the reaction temperature is at or has exceeded a maximum (cf. U.S. Pat. No. 4,076,919). Here the disadvantage is that, as a consequence of the different polymerization behaviors of ethylene and acrylic acid esters under the conditions of high pressure copolymerization, the copolymers obtained are composed of unfavorable distributions of the monomers, with the comonomers being preferentially polymerized into the low molecular weight portions of the copolymers. This has negative repercussions for the mechanical strength of the products obtained from the copolymers.

It has further been proposed that the amount of acrylic acid ester required for copolymerization with ethylene be metered into the polymerization system only in the form of a secondary stream (cf. EP Patent No. 96,221), or that from 55 to 75% of the amount of acrylic acid ester be fed in at the inlet point of the reactor in the form of a main stream and from 25 to 45% of said quantity be fed in at a second feed point downstream of the inlet point along the polymerization system in the form of a secondary stream, the maximum temperature downstream of the second feed point being from 20° to 50° C. lower than the maximum temperature upstream of the second feed point (cf. EP Patent No. 98,488). It is true that using these processes it is possible to increase the conversion. However, the copolymers obtained are still deficient in mechanical strength, in particular tear strength.

It is an object of the present invention to provide a process for copolymerizing ethylene with an acrylic acid ester or a mixture of free acrylic acid in an acrylic acid ester in a tubular polymerization system which, without sacrificing the good general properties of the polymer or the high conversion, improves in particular the mechanical strength, such as tear strength, of products produced from the copolymer.

We have found that this object is achieved with a process as claimed in claim 1 or 2 or 3 or 4 or 5.

For the purposes of the present invention, an ethylene/acrylic acid ester copolymer is a copolymer of ethylene which is preparable under the stated temperature and pressure conditions, preferably at a pressure of from 1,500 to 3,000 bar and at a temperature of from 150° to 350° C. The term ethylene/acrylic acid ester copolymers includes copolymers containing copolymerized comonomer in amount of from 0.2 up to 25.0, preferably from 0.5 to 20.0, percent by weight which have a melt flow index of from 0.1 to 25 g/10 min, determined in accordance with ASTM-D 1238-65 T at 190° C. under a load of 2.16 kg, and a density of from 0.890 to 0.934 g/cm$^3$, measured in accordance with DIN 53,479.

Suitable acrylic acid esters are all the acrylic acid esters which are copolymerizable with ethylene under the stated temperature and pressure conditions. These comonomers are for example esters of acrylic and methacrylic acid with $C_1$–$C_8$-alkanols, preferably $C_1$–$C_6$alkanols. Particular preference is given to methyl acrylate and n-butyl acrylate. It is also possible to use mixtures of acrylic acid esters or solutions of free acrylic acid in an acrylic acid ester. Preferably the acrylic acid ester/acrylic acid solutions contain up to 50% by weight, in particular up to 30% by weight, of acrylic acid.

The ethylene is copolymerized with the acrylic acid ester in the presence of a free radical initiator. For the purposes of the present invention, free radical polymerization initiators are those catalysts which are also used for the homopolymerization of ethylene under high pressure. An example of a suitable free radical initiator is oxygen, expediently in an amount of from 2 to 100 mol-ppm, based on the ethylene to be polymerized. Also suitable are peroxides and other free radical producers and also mixtures of peroxides which have different decomposition points, as well as hydroperoxides and mixtures of oxygen and peroxides and/or hydroperoxides. Specific examples of peroxides and hydroperoxides are: tert-butylperoxy pivalate, di-tert-butyl peroxide, tert-butyl hydroperoxide, tert-butyl perbenzoate, p-methane hydroperoxide and dilauroyl peroxide. Free radical polymerization initiators is also to include compounds such as azobisisobutyrodinitrile. It is also possible to use mixtures of oxygen and one or more peroxides. Preferably the copolymerization of ethylene with an acrylic acid ester is initiated with atmospheric oxygen.

It is customary to work in the presence of a polymerization regulant. With the aid of polymerization regulants it is possible to set the melt flow index of the resulting ethylene copolymers. Suitable regulants are for example hydrogen, ketones, aldehydes, alcohols, ethers or normal or branched hydrocarbons. It is preferable to use propane, propylene, methyl ethyl ketone or propionaldehyde. The polymerization regulant is in general used in an amount of from 0.2 to 5 mole percent, based on the ethylene to be polymerized. In a particular embodiment of the process, however, the comonomer used itself can serve as regulant, in which case no additional polymerization regulant is employed.

The polymerization is in general carried out in the absence of solvent. The small amounts of inert solvent, such as benzene, mineral oil or any other inert solvent, in which the polymerization initiator is dissolved are negligible compared with the other feed materials. If oxygen is used as polymerization initiator, no solvent is required.

The process can be carried out using a customary continuously operated tubular high pressure polymerization system (a tubular reactor). Tubular reactors are tubular polymerization vessels whose length to diameter ratio of the pressure-resistant tubes ranges from 10,000 to 60,000:1. Details of ethylene high pressure polymerization processes employing tubular reactors can be found for example in Ullmann's Encyklopadie der technischen Chemie, volume 19 (1980), 4th edition, pages 167 to 178, Verlag Chemie GmbH, D-6940 Weinheim.

In existing processes, the gaseous mixture of ethylene, acrylic acid ester, initiator and if necessary regulant is fed into the reactor at the inlet point and at the same time at a second point downstream of the inlet point along the tubular reactor in the direction of flow of the ethylene to be polymerized, where the reaction temperature has exceeded a maximum. An inlet point is in general to be understood as meaning the initial part of the tubular reactor. In these existing processes, it is the main stream which is introduced in the initial part of the reactor, while the secondary stream is fed into the reactor in a conventional manner at a point downstream of which a temperature peak develops. The result of this measure is the known reaction system of the two-zone tubular reactor.

In the process of the invention, then, the improvement comprises feeding in secondary streams (I) at points where the reaction temperature has just exceeded a maximum temperature due to the heat of polymerization and secondary streams (II) at points which, relative to the direction of flow of the ethylene, are positioned upstream of the feed points of secondary streams (I) and upstream of the respective maximum temperature. A preferred procedure comprises feeding in a secondary stream (I) at a point where the reaction temperature has just exceeded a maximum temperature and a secondary stream (II) upstream of this maximum temperature. This procedure is employable in two-zone reactors, the secondary stream (II) being additionally fed into the running reaction upstream of the maximum temperature. Preferably, in the process according to the invention, the secondary stream (I) is introduced at a point where the reaction mixture in the tubular reactor has a temperature of from 290° to 310° C. and the secondary stream (II) at a point upstream thereof where the reaction mixture is from 30° to 60° C., in particular from 45° to 55° C., cooler than the maximum temperature. Particular preference is also given to a procedure where the amount of acrylic acid ester required for copolymerization is predominantly fed in by way of the secondary streams (I and II). The ratio of the gaseous main stream: secondary stream I:secondary stream II is maintained within the range from 10:9:1 to 10:5:5.

In the passing in of the secondary stream (II) into the reactor, preferably at a temperature of the reaction mixture of from 250° to 270° C., the temperature of the mixture is initially reduced to from 210° to 240° C. and then reaches maxima of from 290° to 310° C., in particular from 300° to 310° C.

Through the measure according to the invention it is possible to obtain an improvement in the mechanical strength, in particular tear strength and stiffness, of products produced from the ethylene/acrylic acid ester copolymer.

According to the Examples, the ethylene had the stated amount of oxygen and comonomer added to it in two separate gas streams and was compressed to the reaction pressure of 2,200 bar. A secondary stream (II) was branched off before the unification of the compressed gas streams and was fed into the running reaction at a feed point upstream of the maximum temperature, while another secondary stream (I) was fed in at a short distance downstream of the maximum temperature; the main stream was fed in at the reactor intake point. Tubular reactors of known design were used. In the case of the two-zone reactor, the feed point for secondary stream (II) is upstream of the maximum temperature of the first reaction zone; it is also possible to employ one feed point each for the two reaction zones upstream of the respective maximum temperature.

The reactor had a length/diameter ratio of about 10,500:1. To remove some of the heat of polymerization, the tube walls were cooled from the outside with water. In carrying out the Comparative Example, the corresponding amount of acrylic acid ester was added only to the gas stream which leads to the inlet point at the entry of the reactor and to secondary stream I; no secondary stream II was employed. The copolymer obtained was separated off from unconverted monomer in a conventional manner in separators downstream of the reactor.

EXAMPLE 1

The reactor described above was charged at the entrance with a main stream comprising 9,723 parts by weight/hour of ethylene and 277 parts by weight/hour of n-butyl acrylate together with 11.6 mol-ppm of oxygen, based on ethylene, as polymerization initiator. In the form of secondary streams I and II the reactor was charged with a mixture comprising 9,506 parts by weight/hour of ethylene, 494 parts by weight/hour of n-butyl acrylate and 7 mol-ppm of oxygen, based on ethylene.

Under a reaction pressure of 2,200 bar, measured at the reactor entrance, the reaction mixture reached a temperature of 260° C. upstream of the 1st feed point as a result of the heat of reaction, passed after addition of secondary stream (II) through a temperature range of from 220° to 230° C. and thereafter attained a maximum temperature of 300° C. in the middle of the reaction zone at the 2nd feed point.

Secondary stream I contained 374 parts by weight of n-butyl acrylate, while secondary stream II contained 120 parts by weight thereof.

In this way 4,650 parts by weight of an ethylene/n-butyl acrylate copolymer were obtained with an acrylate content of 16.4% by weight, preferentially in the high molecular weight copolymer.

The density of the copolymer obtained was 0.9242 g/cm$^3$, measured in accordance with DIN 53,479; the melt flow index was 1.65 g/10 min, measured in accordance with DIN 53,735.

The copolymer obtained had a relatively narrow molecular weight distribution with the main proportion of the copolymerized acrylate being in the higher molecular weight copolymer. The elution diagram (cf. FIG. 1) was obtained with the aid of gel permeation chromatography. The molecular weight distribution shown therein was determined via the relative change in the refractive indexes of the eluted fractions compared with the solvent, and the copolymer content via the relative change in intensity in the IR spectrum.

The continuous lines (Example 1) and the continuous line with crosses (Comparative Example 1) show the molecular weight distribution, while the discontinuous lines (dashes Example 1, crosses Comparative Example 1) represent the distribution of copolymerized acrylate.

The product obtained was found to have a tear strength of 19.6 N/mm$^2$, measured on 0.5 mm thick test sheets (test specimen No. 4) in accordance with DIN 53,455.

EXAMPLE 2

Example 1 was repeated with the following amounts in the gas streams:

|  | Ethylene | n-Butyl acrylate |
|---|---|---|
| Main stream | 9,715 parts by weight | 285 parts by weight |
| Secondary stream I | 6,005 parts by weight | 295 parts by weight |
| Secondary stream II | 3,530 parts by weight | 170 parts by weight |

The addition of secondary stream II to the running reaction took place at 245° C.; thereafter a maximum temperature of 305° C. was reached in the middle of the reaction zone.

4,700 parts by weight of an ethylene/n-butyl acrylate copolymer were obtained with an acrylate content of 15.7% by weight (preferentially in the high molecular weight polymer).

The density of the copolymer obtained wa 0.9238 g/cm$^3$, measured in accordance with DIN 53,479; the melt flow index was 1.48 g/10 min, measured in accordance with DIN 53,735.

The product obtained likewise had a relatively narrow molecular weight distribution, the main proportion of the copolymerized acrylate being in the relatively high molecular weight copolymer.

The copolymer obtained was found to have a tear strength of 21.6 N/mm$^2$, measured on 0.5 mm thick test sheets (test specimen No. 4) in accordance with DIN 53,455.

COMPARATIVE EXAMPLE 1

The reactor was charged at the entrance under a reaction pressure of 2,200 bar with a main stream comprising a mixture of 9,860 parts by weight/hour of ethylene and 140 parts by weight/hour of n-butyl acrylate as well as 10.2 mol-ppm of oxygen, based on ethylene, as polymerization initiator. Nothing was fed in by way of secondary stream II.

The reaction mixture attained a maximum temperature of 295° C.; a mixture of 9,440 parts by weight of ethylene and 560 parts by weight of n-butyl acrylate were fed in downstream of this maximum temperature as secondary stream I.

4,150 parts by weight of ethylene/n-butyl acrylate copolymer were obtained with an acrylate content of 16.5% by weight (preferentially in low molecular weight copolymer).

The density of the product was 0.9240 g/cm$^3$, measured in accordance with DIN 53,479. The melt flow index was 1.55 g/10 min, measured in accordance with DIN 53,735. The elution diagram revealed that the bulk of the copolymerized acrylate was not in the relatively high molecular weight copolymer. The product obtained was found to have a tear strength of 11.5 N/mm$^2$, measured on 0.5 mm thick test sheets in accordance with DIN 53 455.

COMPARATIVE EXAMPLE 2

The reactor was fed under a reaction pressure of 2,20 bar at the entrance (as main stream) with 10,000 parts by weight of ethylene and 11.4 mol-ppm oxygen, based on ethylene.

Secondary stream II was not used. All of the comonomer, n-butyl acrylate, was added by way of secondary stream I (670 parts by weight of n-butyl acrylate and 9,330 parts by weight of ethylene).

The reaction mixture attained a maximum reaction temperature of 300° C.

4,060 parts by weight of an ethylene/n-butyl acrylate copolymer were obtained with an acrylate content of 16.2% by weight (preferentially in the relatively low molecular weight copolymer).

The density of the copolymer was 0.9243 g/cm$^3$, measured in accordance with DIN 53,479. The melt flow index was 1.78 g/10 min, measured in accordance with DIN 53,735.

The copolymer obtained was found to have a tear strength of from 7 to 8 N/mm$^2$, measured on 0.5 mm thick test sheets in accordance with DIN 53,455.

SYNOPSIS (1) Proportion of n-butyl acrylate, in % by weight, added in

| Main stream | Secondary stream I | Secondary stream II | Examples |
|---|---|---|---|
| 35.9 | 48.5 | 15.6 | 1 |
| 38.0 | 39.3 | 22.7 | 2 |
| 20 | 80 | 0 | Comparison 1 |
| 0 | 100 | 0 | Comparison 2 |

(2) Collation of properties of resulting copolymers

| Example | Melt flow index g/10 min | Density g/cm$^3$ | Acrylate content (% of n-BA) | Tear strength N/mm$^2$ | Acrylate preferentially copolymerized in |
| --- | --- | --- | --- | --- | --- |
| 1* | 1.65 | 0.9242 | 16.4 | 19.6 | high molecular weight polymer |
| 2 | 1.48 | 0.9238 | 15.7 | 21.6 | high molecular weight polymer |
| Comparison 1* | 1.55 | 0.9240 | 16.5 | 11.5 | low molecular weight polymer |
| Comparison 2 | 1.78 | 0.9243 | 16.2 | 7–8 | low molecular weight polymer |

*elution diagrams, see drawing

We claim:

1. A process for preparing a copolymer of ethylene with an acrylic acid ester by copolymerizing 100 parts by weight of ethylene with from 0.1 to 25.0 parts by weight of an acrylic acid ester or of a solution of free acrylic acid in an acrylic acid ester in a continuously operated tubular polymerization reactor at pressures of from 500 to 5,000 bar and at temperatures of from 50° to 450° C. in the presence of a polymerization initiator which decomposes into free radicals which process further comprises: feeding a mixture of ethylene, comonomer and initiator into the tubular polymerization reactor in the form of a main stream at the inlet point of the reactor; passing said mixture along said reactor where the ethylene and comonomer polymerize to form a copolymer; feeding into the reactor an additional amount of said mixtures in one or more secondary streams(I) at a point or points where a maximum temperature is reached in the reactor due to the heat of polymerization, and feeding a further amount of said mixture into the reactor in one or more secondary streams(II) at a point or points which, relative to the direction of flow of the ehtylene, are positioned upstream of the feed points of secondary streams(I) and upstream of the points at which a maximum temperature is reached in the reactor.

2. The process of claim 1, wherein a secondary stream (I) is fed in at a point where a maximum temperature is reached and a secondary stream (II) is fed in upstream of this maximum temperature.

3. The process of claim 1, wherein secondary stream (I) is fed in at a point where the reaction mixture has a temperature of from 290° to 310° C. and secondary stream (II) is fed in at a point upstream thereof where the reaction mixture is cooler by from 30° to 60° C.

4. The process of claim 1, wherein the amount of comonomer required for copolymerization is predominantly fed in through secondary streams (I) and (II).

5. The process of claim 1, wherein the mixture further contains a polymerization regulant.

* * * * *